(12) United States Patent
Kunitani et al.

(10) Patent No.: US 6,580,464 B1
(45) Date of Patent: Jun. 17, 2003

(54) COLOR DIFFERENCE SIGNAL CORRECTION APPARATUS

(75) Inventors: Hisao Kunitani, Kyoto (JP); Atsuhisa Kageyama, Osaka (JP); Katsuya Ishikawa, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 416 days.

(21) Appl. No.: 09/721,873

(22) Filed: Nov. 27, 2000

(30) Foreign Application Priority Data

Nov. 25, 1999 (JP) ............................................. 11-334164

(51) Int. Cl.[7] ................................................. H04N 9/73
(52) U.S. Cl. ........................ 348/656; 348/631; 348/600
(58) Field of Search ................................. 348/655, 656, 348/710, 612, 649, 569, 564, 631, 599, 600; H04N 9/73, 9/74

(56) References Cited

U.S. PATENT DOCUMENTS

| | | | |
|---|---|---|---|
| 4,633,299 A | * 12/1986 | Tanaka | 358/29 |
| 5,075,766 A | * 12/1991 | Sendelweck | 358/22 |
| 5,146,323 A | * 9/1992 | Kobori et al. | 358/76 |
| 5,206,728 A | * 4/1993 | Kim | 358/168 |
| 6,204,883 B1 | * 3/2001 | Tsukagoshi | 348/468 |
| 6,480,240 B1 | * 11/2002 | Tamura et al. | 348/159 |

FOREIGN PATENT DOCUMENTS

JP          2-196588         8/1990

* cited by examiner

*Primary Examiner*—Victor R. Kostak
(74) *Attorney, Agent, or Firm*—Wenderoth, Lind & Ponack, L.L.P.

(57) ABSTRACT

The present invention provides a color difference signal correction apparatus for correcting color difference of parts having no color, particularly white characters, which can make the correction with high accuracy also for images including lightly colored parts. The color difference signal correction apparatus of the present invention comprises a full-wave rectification circuit 12 for full-wave rectifying an input color difference signal (R−Y)a, a full-wave rectification circuit 13 for full-wave rectifying an input color difference signal (B−Y)b, an addition circuit 14 for adding the outputs of the full-wave rectification circuit 12 and the full-wave rectification circuit 13, an addition circuit 4 for adding a white character slice level signal e and the output of the addition circuit 14, a luminance signal slice circuit 5 for slicing a luminance signal g with the output of the addition circuit 4, and an addition circuit 6 for adding the output of the luminance signal slice circuit 5 and the input color difference signal (B−Y)b and outputting the addition result.

12 Claims, 7 Drawing Sheets

COLOR DIFFERENCE SIGNAL CORRECTION APPARATUS

FIELD OF THE INVENTION

The present invention relates to a color difference signal correction apparatus which makes a correction for changing color temperatures of brighter whites such as white telop characters in display outputs of digitally driven display devices or the like. More particularly, this invention relates to a color difference signal correction apparatus for making a correction of white characters (hereinafter referred to as white character correction).

BACKGROUND OF THE INVENTION

In recent years, the demand for digitally driven display devices such as PDP (plasma display panel) and LCD (liquid crystal display) is growing, and the demand for image quality is more and more increasing. A color difference signal correction apparatus for particularly correcting color temperatures of white characters, i.e., making the white character correction has become valued as a circuit for changing a balance between primary colors of red, blue and green and correcting the color temperatures to make images more clear.

Figure 5:
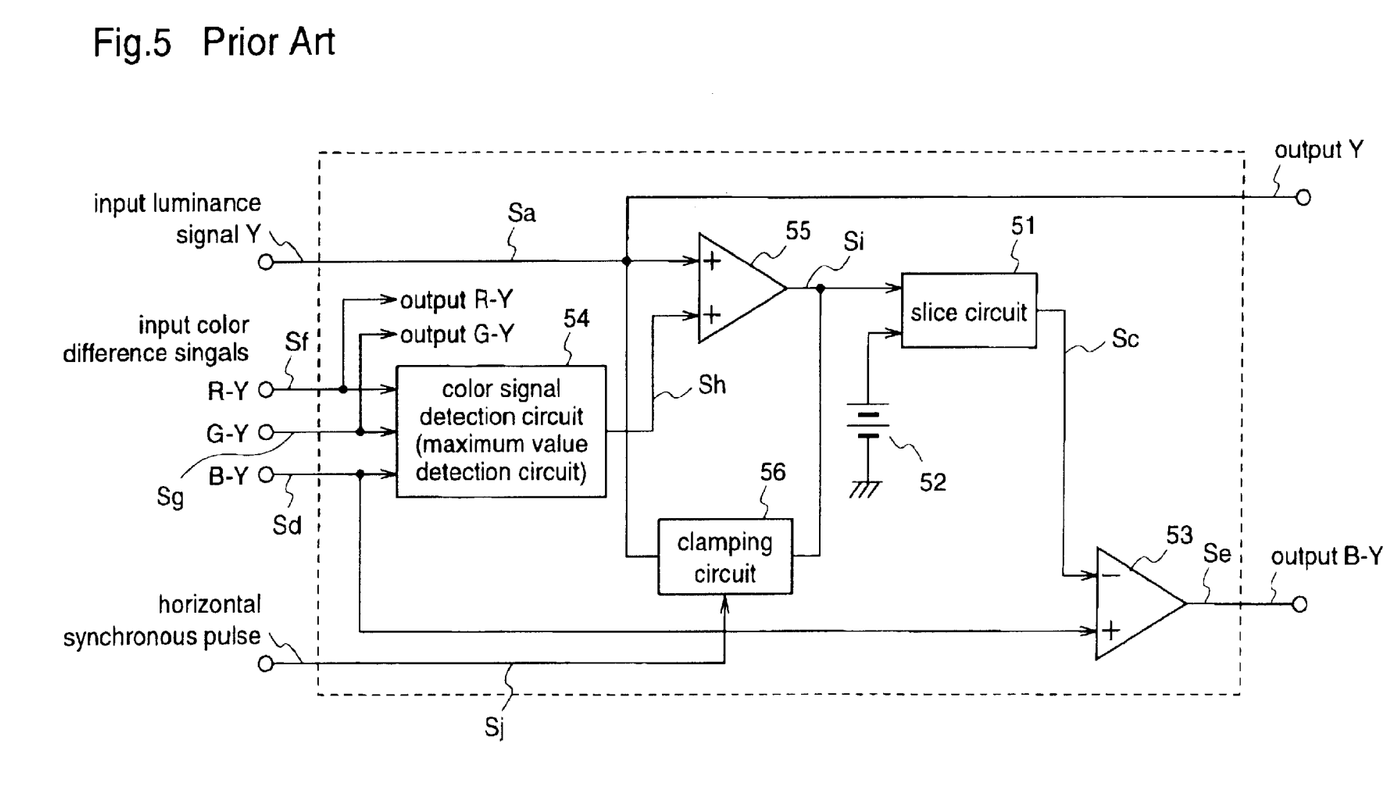
FIG. 5 is a block diagram illustrating a structure of a prior art color temperature correction apparatus.

FIG. 5 is a block diagram illustrating a structure of a prior art color temperature correction apparatus for making the above-mentioned white character correction, disclosed in Japanese Published Patent Application No.2-196588. In this figure, a color signal detection circuit 54 receives color difference signals (R–Y) Sf, (G–Y) Sg and (B–Y) Sd obtained from a color demodulation circuit (not shown) which is provided in a previous stage of the color temperature correction apparatus, and outputs the maximum value among these color difference signals as a color detection signal Sh, thereby detecting a color. An addition circuit 55 adds an input luminance signal Sa and the color detection signal Sh which is output by the color signal detection circuit 54, and outputs a corrected luminance signal Si. A slice circuit 51 compares a slice level voltage which is output by a slice level voltage generation circuit 52 with the corrected luminance signal Si from the addition circuit 55, and when the input corrected luminance signal is below the slice level voltage outputs this signal as a correction signal Sc. The slice level voltage generation circuit 52 generates a DC voltage for deciding a level at which the output of the addition circuit 55 is sliced. A subtraction circuit 53 subtracts the correction signal Sc which is output by the slice circuit 51 from the color difference signal (B–Y) Sd, and outputs a corrected color difference signal. A clamping circuit 56 returns the pedestal level of the luminance signal, which has been changed due to the addition to the original level on the basis of a horizontal synchronous pulse Sj.

Figure 6:
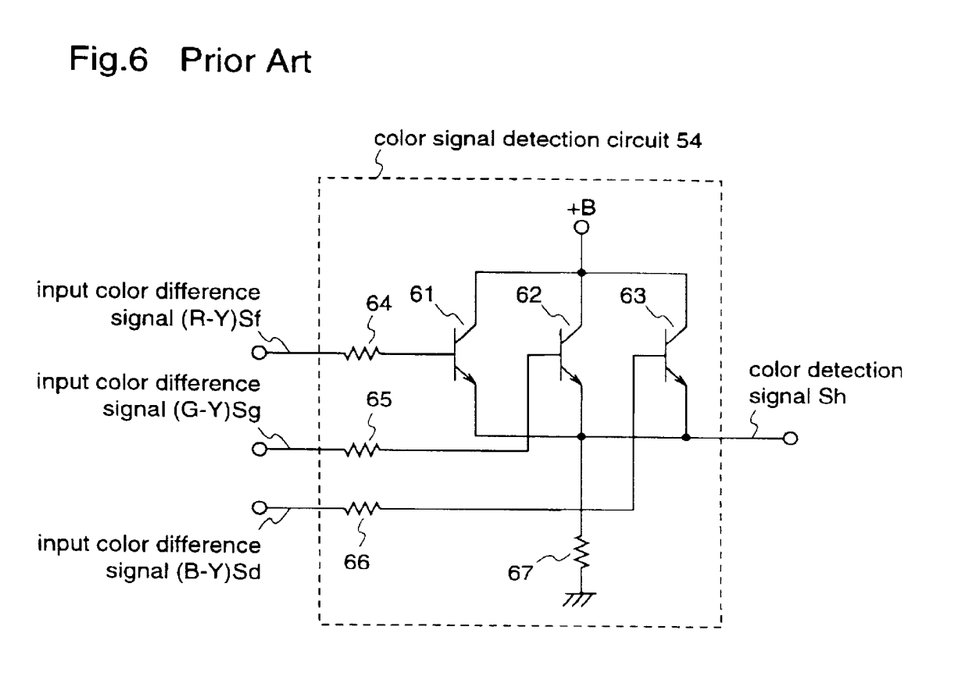
FIG. 6 is a circuit diagram illustrating a structure of a color signal detection circuit of the prior art color temperature correction apparatus.

FIG. 6 is a circuit diagram illustrating the structure of the color signal detection circuit 54. The color signal detection circuit 54 comprises transistors 61, 62 and 63, bases of which receives the color difference signals (R–Y) Sf, (B–Y) Sd and (G–Y) Sg, respectively, and their base resistors 64, 65 and 66. Emitters of the transistors 61, 62 and 63 are commonly connected and constitutes a color detection signal output terminal, and the transistors 61, 62 and 63 are grounded via a common emitter resistor 67. In addition,the power voltage +B is supplied to the correctors. The detected color signal is output as the color detection signal Sh from the color detection signal output terminal.

Figure 7:
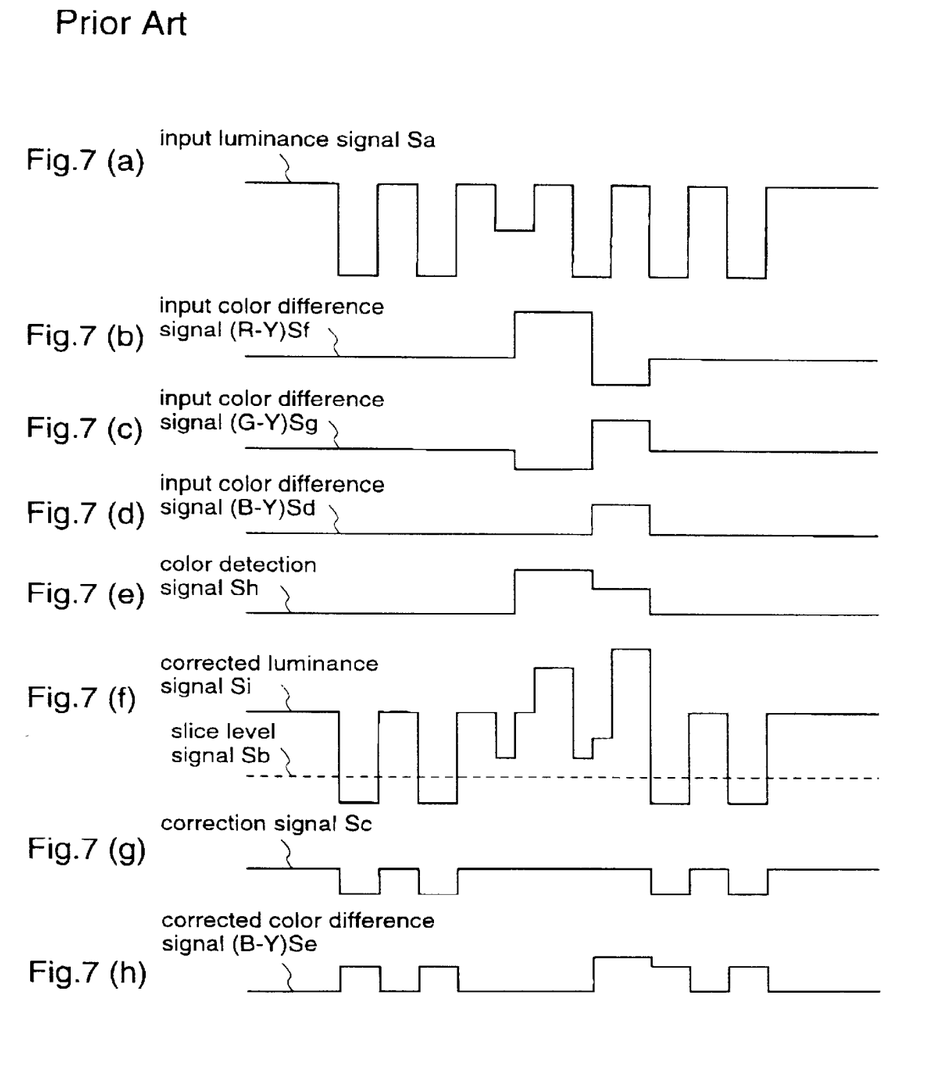
FIGS. 7(a)–7(h) are diagrams for explaining the prior art color temperature correction apparatus.

FIGS. 7(a)–7(h) are diagrams showing waveforms of signals which are obtained in the respective elements of the prior art color temperature correction apparatus. FIG. 7(a) shows the waveform of the input luminance signal Sa. FIGS. 7(b), 7(c) and 7(d) show the waveforms of the color difference signals (R–Y) Sf, (G–Y) Sg and (B–Y) Sd, respectively. FIG. 7(e) shows the waveform of the color detection signal Sh. FIG. 7(f) shows the waveform of the corrected luminance signal Si and the waveform of the slice level signal Sb. FIG. 7(g) shows the waveform of the correction signal Sc, and FIG. 7(h) shows the waveform of the corrected color difference signal Se.

Hereinafter, the operation of the so-constructed color temperature correction apparatus will be described. Initially, the color difference signals (R–Y) Sf, (G–Y) Sg and (B–Y) Sd having the waveforms as shown in FIGS. 7(b)–7(d), respectively, which are output by the color modulation circuit in the previous stage (not shown) are input to the color signal detection circuit 54. The color signal detection circuit 54 detects the maximum value among the three input signals and outputs the detected color signal as the color detection signal Sh. Then, the color detection signal Sh and the input luminance signal Sa as shown in FIG. 7(a) are added by the addition circuit 55 and the corrected luminance signal Si is output. In this prior art, assume that a brighter luminance signal has a lower voltage. The corrected luminance signal Si is input to the slice circuit 51 and compared with the slice level voltage Sb from the slice level voltage generation circuit 52, as shown in FIG. 7(f). Then, a part of the luminance signal, which is lower than the voltage Sb is output as the correction signal Sc as shown in FIG. 7(g). Then, the correction signal Sc is input to the subtraction circuit 53 and subtracted from the input color difference signal (B–Y) Sd, whereby the corrected color difference signal Se which has been corrected to increase the color temperature of the sliced part is obtained.

As described above, in the prior art color temperature correction apparatus, the color signal detection circuit 54 detects the maximum value among the input three color difference signals and outputs the color detection signal Sh. Then, the color detection signal Sh is added to the input luminance signal Sa. Accordingly, the input luminance signal is corrected to increase its level by the color detection signal Sh in a colored part. Consequently, the input luminance signal is not sliced in the colored part and therefore even when the luminance is higher the color temperature correction is not performed to the colored part, i.e., the part which is not white.

However, in the prior art, only the maximum value among the input color difference signals (R–Y), (B–Y) and (G–Y) is extracted by the color signal detection circuit and added to the input luminance signal, whereby the white character correction is hardly performed in the colored parts. Therefore, in some cases, the white character correction may be applied to light colors like flesh tones. In addition, it is impossible to make a fine adjustment to the white character correction with high accuracy so that the white character correction is not applied to the light colors like flesh tones.

In addition, according to the prior art construction, in cases of a picture whose frame is entirely whitish, i.e., a picture having a high brightness level of the whole frame, the color temperature correction is performed to many parts in the frame. Therefore, the sufficient effects of the white character correction cannot be obtained and further the frame becomes generally bluish.

Further, according to the prior art construction, the base resistors and the emitter resistors are used in the color signal detection circuit. The maximum value of the color is adversely varied due to dispersion errors of these resistors. Accordingly, when the luminance signal is to be shifted toward black according to the sizes of the color, there is the possibility that the signal is sliced and then the white character correction is performed with low accuracy.

Furthermore, according to the prior art construction, the fine adjustment to the effects of the white character correction so that an image which is obtained as a result of the white character correction has an optimum image quality for an apparatus which utilizes the color temperature correction apparatus cannot be made.

SUMMARY OF THE INVENTION

It is an object of the present invention to provide a color difference signal correction apparatus which can apply white character correction with high accuracy also to an image which includes a lightly colored part.

It is another object of the present invention to provide a color difference signal correction apparatus which can apply the white character correction with high accuracy also when the brightness level of the whole frame is higher.

It is another object of the present invention to provide a color difference signal correction apparatus which can prevent the reduction in accuracy of the white character correction due to dispersion in the resistors or the like.

It is another object of the present invention to provide a color difference signal correction apparatus which can finely adjust the effects of the white character correction.

Other objects and advantages of the present invention will become apparent from the detailed description and specific embodiments described are provided only for illustration since various additions and modifications within the spirit and scope of the invention will be apparent to those of skill in the art from the detailed description.

A color difference signal correction apparatus according to a 1st aspect of the present invention comprises: a first full-wave rectification means for receiving a (R−Y) color difference signal and full-wave rectifying the (R−Y) color difference signal; a second full-wave rectification means for receiving a (B−Y) color difference signal and full-wave rectifying the (B−Y) color difference signal; a first addition means for adding an output of the first full-wave rectification means and an output of the second full-wave rectification means; a second addition means for receiving a white character slice level signal, and adding the white character slice level signal and an output of the first addition means; a slice means for receiving a luminance signal and slicing the luminance signal with an output of the second addition means; and a third addition means for adding an output of the slice means and the (B−Y) color difference signal. Therefore, the white character correction can be made also to images including lightly colored parts with high accuracy.

According to a 2nd aspect of the present invention, the color difference signal correction apparatus of the 1st aspect comprises: a gain control means for changing a gain of the output of the first addition means and outputting a changed gain to the second addition means, between the first addition means and the second addition means, and the second addition means adds the white character slice level signal and an output of the gain control means. Therefore, the white character correction can be finely adjusted so as not to make the white character correction to light color such as flesh tones.

According to a 3rd aspect of the present invention, the color difference signal correction apparatus of the 1st or 2nd aspect comprises a white character correction effect adjustment means for changing a gain of the output of the slice means and outputting a changed gain to the third addition means, between the slice means and the third addition means, and the third addition means adds the (B−Y) color difference signal and the output of the white character correction effect adjustment means. Therefore, the effects of the white character correction can be fined adjusted.

According to a 4th aspect of the present invention, the color difference signal correction apparatus of one of the 1st to 3rd aspect comprises: a fourth addition means for receiving an average picture level signal and adding the average picture level signal and the output of the second addition means to output an addition result to the slice means, between the second addition means and the slice means, and the slice means slices the luminance signal with an output of the fourth addition means. Therefore, the white character correction can be made with high accuracy according to the brightness level of the whole frame.

According to a 5th aspect of the present invention, the color difference signal correction apparatus of the 4th aspect comprises: an average picture level gain control means for receiving the average picture level signal and changing a gain of the average picture level signal to output a changed gain to the fourth addition means, and the fourth addition means adds an output of the average picture level gain control means and the output of the second addition means to output an addition result to the slice means. Therefore, the effects of the white character correction according to the brightness level of the whole frame can be finely adjusted.

A color difference signal correction apparatus according to a 6th aspect of the present invention comprises: a first addition means for receiving a white character slice level signal and an average picture level signal, and adding the white character slice level signal and the average picture level signal; a slice means for receiving a luminance signal and slicing the luminance signal with an output of the first addition means; and a second addition means for receiving a (B−Y) color difference signal, and adding an output of the slice means and the (B−Y) color difference signal. Therefore, the white character correction can be made with high accuracy according to the brightness level of the whole frame.

According to a 7th aspect of the present invention, the color difference correction apparatus of the 6th aspect comprises: an average picture level gain control means for receiving the average picture level signal, and changing a gain of the average picture level signal to output a changed gain to the first addition means, and the first addition means adds an output of the average picture level gain control means and the white character slice level signal to output an addition result to the slice means. Therefore, the effects of the white character correction according to the brightness level of the whole frame can be finely adjusted.

DETAILED DESCRIPTION OF THE PREFERRED EMBODIMENTS

Embodiment 1

Figure 1:
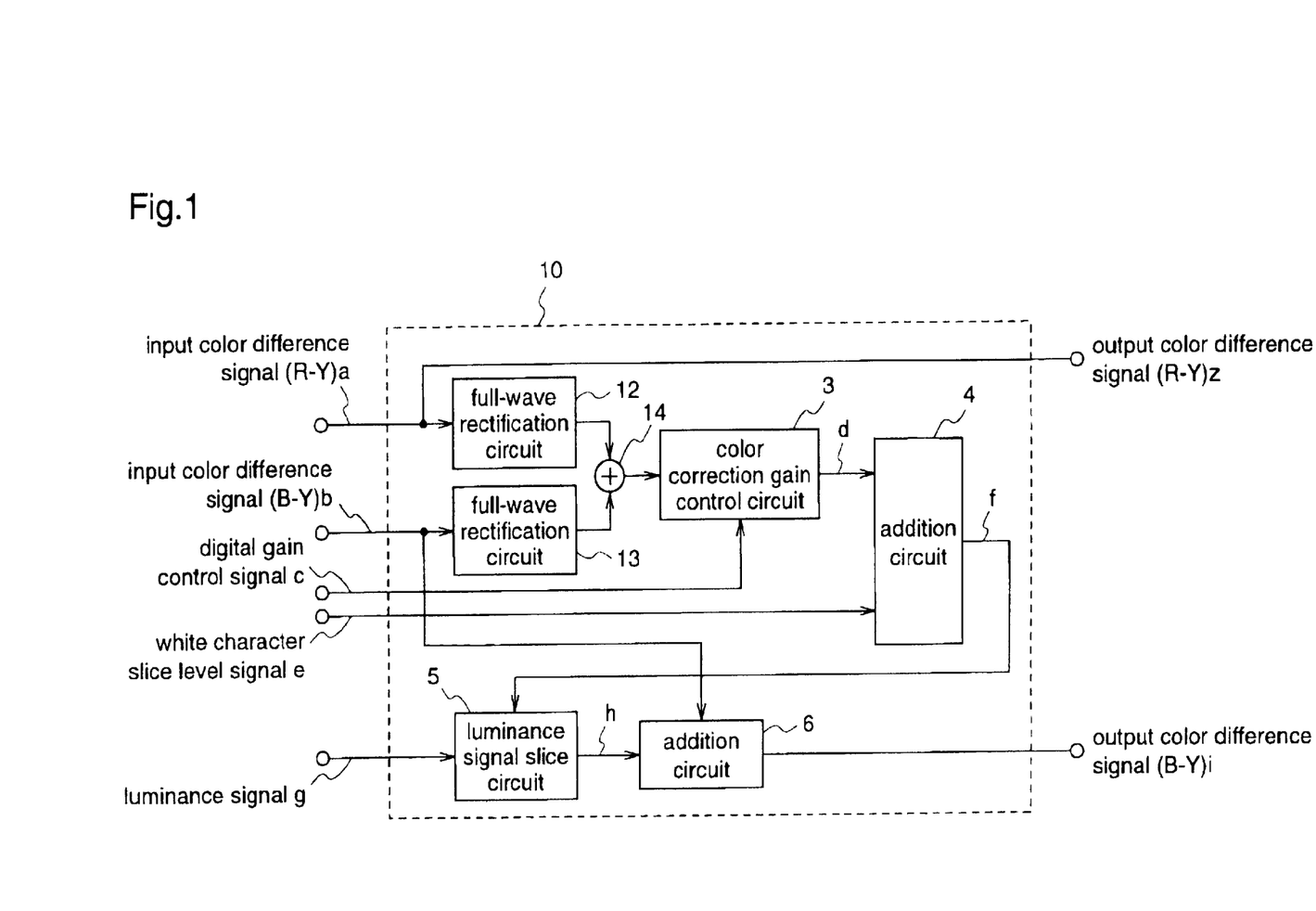
FIG. 1 is a block diagram illustrating a structure of a color difference signal correction apparatus according to a first embodiment of the present invention.

FIG. 1 is a block diagram illustrating a structure of a color difference signal correction apparatus according to the first embodiment of the present invention. In this figure, a color difference signal correction apparatus 10 comprises a full-wave rectification circuit 12 for full-wave rectifying the input color difference signal (R-Y)a which is input from the outside, a full-wave rectification circuit 13 for full-wave rectifying the input color difference signal (B-Y)b which is input from the outside, an addition circuit 14 for adding the output of the full-wave rectification circuit 12 and the output of the full-wave rectification circuit 13, a color correction gain control circuit 3 for adjusting the gain which is output from the addition circuit 14 in accordance with a digital gain control signal c which is input from the outside, thereby making the adjustment for avoiding the correction for a colored part, an addition circuit 4 for adding a color correction output signal d which is output by the color correction gain control circuit 3 and a white character slice level signal e which is input from the outside, a luminance signal slice circuit 5 for slicing a luminance signal g which is input from the outside with a corrected white character slice level signal f which is obtained by the addition circuit 4, and an addition circuit 6 for adding the output signal h of the luminance signal slice circuit 5 and the input color difference signal (B-Y)b, and outputting an output color difference signal (B-Y)i. These respective circuits are digital circuits for processing digital signals, and input or output signals are all digital signals. In this case, the input color difference signals (R-Y)a and (B-Y)b take an integral value from -128 to 127, respectively. When the value is 0, it means that the signal has no color related to the color difference component. The full-wave rectification circuit 12 and the full-wave rectification circuit 13 subject the input color difference signals (R-Y)a and (B-Y)b which are input from a color demodulation circuit (not shown) or the like to the full-wave rectification, respectively, and leave positive values as they are and reverse negative values into positive values, thereby to extract the signal levels of the input color difference signals (R-Y)a and (B-Y)b as positive values, respectively. To be specific, when there is a color, the signal level of the color difference signal related to the color is detected as a positive value. The digital gain control signal c is a signal for adjusting the amount of the gain, which is output from an external microcomputer or the like (not shown) as a signal of a fixed level. As the signal level of the digital gain control signal c, a signal level which is considered to be optimum for other apparatus which utilizes the color difference signal correction apparatus 10 is previously set in the above-mentioned external microcomputer or the like. The white character slice level signal e is a signal for setting a brightness level at which the white character correction is applied. This white character slice level signal e is previously set as a fixed value in the above-mentioned external microcomputer or the like. The luminance signal g is input by a color demodulation circuit (not shown) or the like. In this case, assume that a brighter color has a signal of a higher signal level. In addition, the input color difference signal (R-Y)a is input to the full-wave rectification circuit 12 as well as output outside as it is as an output color difference signal (R-Y)z.

FIGS. 2(a)–2(f) are diagrams for explaining the color difference signal correction apparatus according to the first embodiment. FIG. 2(a) is a diagram showing the relationship of signal waveforms between the white character slice level signal e and the luminance signal g.

FIG. 2(b) is a diagram showing the signal waveform of the input color difference signal (R-Y)a. FIG. 2(c) is a diagram showing the signal waveform of the input color difference signal (B-Y)b. FIG. 2(d) is a diagram showing the signal waveform of the input color difference signal (B-Y) which is obtained after the full-wave rectification. FIG. 2(e) is a diagram showing the relationship of signal waveforms between the corrected white character slice level signal f and the luminance signal g. FIG. 2(f) is a diagram showing the signal waveform of the output color difference signal (B-Y)i. In this figure, signals 21 and 22 show white character parts, and the luminance signals g of these signals 21 and 22 have the signal levels higher than that of the white character slice level signal e. In addition, a signal 23 is a part having a light color like flesh tones and the signal 23 has the signal level higher than that of the white character slice level signal e. Further, sections of the input color difference signals (R-Y)a and (B-Y)b denoted by numeral 24 are parts having the levels of not 0, i.e., colored parts. Parts other than the section 24 are parts having no color, i.e., parts having the level of 0.

Figure 2:
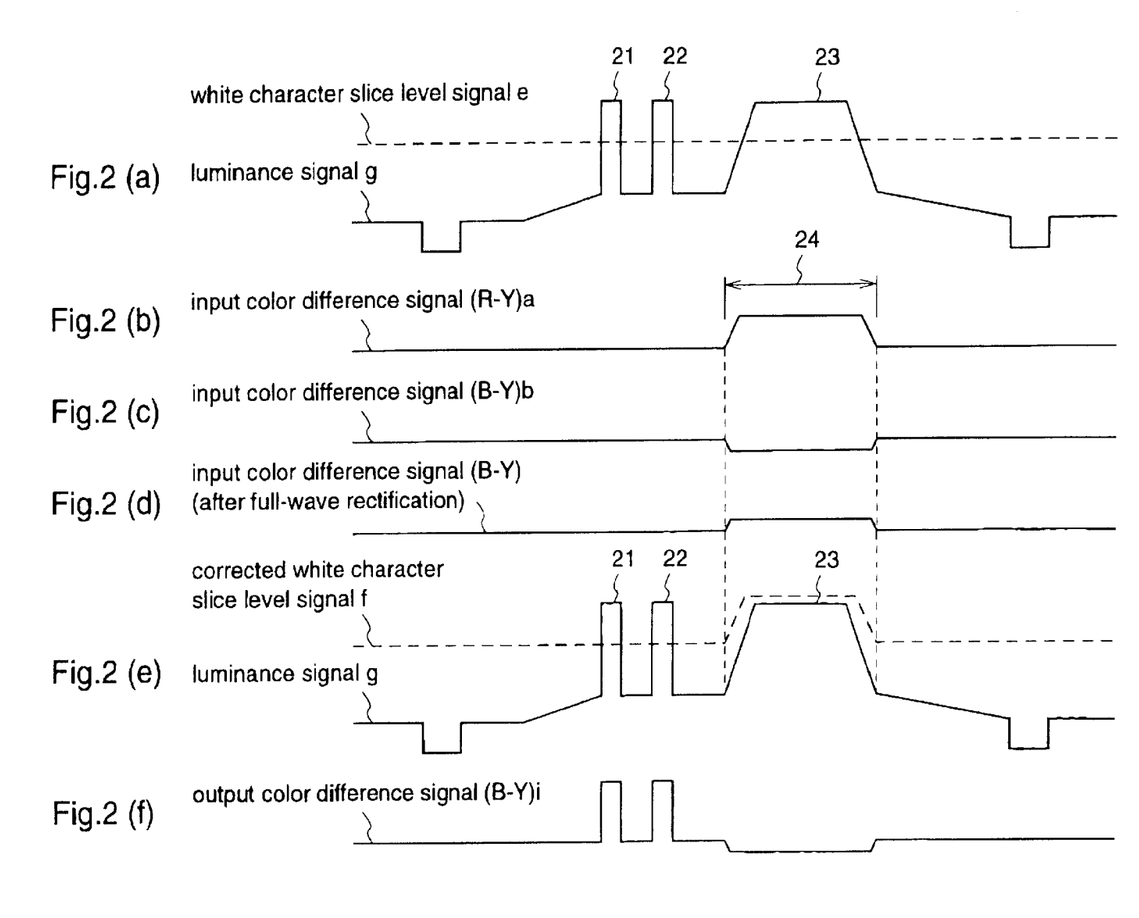
FIGS. 2(a)–2(f) are diagrams for explaining the color difference signal correction apparatus according to the first embodiment.

Then, the operation of the color difference signal correction apparatus according to the first embodiment is described with reference to FIGS. 1 and 2.

When the input color difference signals (R-Y)a and (B-Y)b as shown in FIGS. 2(b) and 2(c) are input to the color difference signal correction apparatus 10, the input color difference signal (R-Y)a is output outside as the output color difference signal (R-Y)z as well as input to the full-wave rectification circuit 12. The input color difference signal (B-Y)b is input to the full-wave rectification circuit 13. Each of the full-wave rectification circuit 12 and 13 outputs the input signal as it is when this signal has a positive level, and reverses the input signal into a positive level when this signal has a negative level and outputs the converted signal. Thereby, the absolute values of the signal levels of the input color difference signals (R-Y)a and (B-Y)b are output, respectively. For example, since the signal level of the input color difference signal (R-Y)a shown in FIG. 2(b) is 0 or positive in this case, this signal is output as it is from the full-wave rectification circuit 12. On the other hand, the input color difference signal shown in FIG. 2(c) has a negative value in the section 24. Therefore, when the input color difference signal (B-Y)b is subjected to the full-wave rectification, a signal having a waveform which is obtained by reversing the part shown by the section 24 into positive as shown in FIG. 2(d) is output from the full-wave rectification circuit 13. Then, the addition circuit 14 adds the outputs of the full-wave rectification circuit 12 and the full-wave rectification circuit 13. Consequently, a signal which is obtained by adding the input color difference signal (R-Y)a as shown in FIG. 2(b) and the input color difference signal (B-Y)b which has been subjected to the full-wave rectification as shown in FIG. 2(d) is output.

Then, the color correction gain control circuit 3 adjusts the gain of the signal obtained by this addition, in accordance with the digital gain control signal c. Consequently, the amount of correction to be made to the slice level in a part of a light color like flesh tones, i.e., a part having not only a color and but also a higher brightness can be adjusted. Thereby, an improved adjustment can be performed so as not to make the color temperature correction to parts having a light color such as flesh tones. The color correction gain control circuit 3 can set the gain so as to multiply the size of the color signal by 0 to N (N is a positive integer). For example, it sets the gain so as to multiply the size of the color signal by 0 to four. The value of the gain is previously set in the external microcomputer or the like so as to obtain an optimum image quality in a state where the video is actually displayed on a display or the like. Since the adjustment of the gain is controlled in accordance with the digital gain control signal c, the gain control can be finely adjusted with high accuracy.

Subsequently, the color correction output signal d output by the color correction gain control circuit 3 and the white character slice level signal e are added by the addition circuit 4. Thereby, in colored parts, the level at which the white characters are sliced is shifted toward the direction in which the luminance signal g is hard to be sliced, i.e., the direction in which the brightness level is increased. Accordingly, even when the brightness is higher in the colored parts, the luminance signal g is not sliced, whereby the white character slice level signal e is corrected so that the color luminance correction is made only to bright whites. Consequently, the corrected white character slice level signal f as shown in FIG. 2(e) is obtained. Then, when the luminance signal slice circuit 5 subtracts the corrected white character slice level signal f from the luminance signal g, parts of the luminance signal g, which are higher than the level of the white character slice level signal f, i.e., parts of the signals 21 and 22 of the white character parts, are sliced here. The signal which is obtained by the slicing is the correction signal h.

Then, the addition circuit 6 adds the correction signal h and the input color difference signal (B–Y)b, whereby the output color difference signal (B–Y)i which has been corrected as shown in FIG. 2(f) is obtained.

As shown in FIG. 2(a), when the original white character slice level signal e is used for slicing the luminance signal g, in addition to the signals 21 and 22 of the white character parts, the level of the luminance signal is higher than the slice level of the white character slice level signal e even in a colored part which is normally to be lower than the white character slice level, when this part has a light color like flesh tones and a higher brightness like in the part shown by the signal 23. Consequently, in this case, the parts of the signals 21 and 22 of the white character parts, which are higher than the level of the white character slice level signal e, as well as the part of the signal 23 of the colored part, which is higher than the level of the white character slice level signal e are sliced. Then, the signal which is obtained by the slicing is added to the input color difference signal (B–Y)b, whereby the color temperature correction is made also to the colored part and the finally obtained image becomes unnatural.

However, according to the first embodiment, two color difference signals, i.e., the input color difference signals (B–Y)b and (R–Y)a which have the levels other than o in colored parts are subjected to the full-wave rectification, whereby the respective signal levels are output as the positive values. Then, the positive values of the respective signal levels are added and the result is added to the white character slice level signal e. Thereby, as shown in FIG. 2(e), the corrected white character slice level signal f which has been corrected so as to make the slice level in the colored section 24 higher than that in the part having no color is obtained. When the luminance signal g is sliced with the corrected white character slice level signal f, since the signal levels of the signals 21 and 22 of the white character parts are higher than that of the corrected white character slice level signal f as shown in FIG. 2(e), the signals 21 and 22 are sliced. On the other hand, the signal 23 of the part having a light color such as flesh tones is not sliced, because the slice level of the signal 23 is higher than that of the part having no color. As a result, as shown in FIG. 2(f), the color temperature correction is not made to parts having light colors such as flesh tones while the color temperature correction, i.e., white character correction is made to parts of white characters.

In addition, in the color temperature correction apparatus which is described as the prior art, one of the three color difference signals, having the maximum value is added to the white character slice level signal. Therefore, when the sizes of the three color difference signals in the colored part are all small, the sufficient correction of the slice level is not made sufficiently and the white character correction may be made also to the lightly colored parts. However, according to this first embodiment, the levels of the two color difference signals are subjected to the full-wave rectification, respectively, to obtain positive values and then these positive values are added. Then, the addition result is added to the white character slice level signal e to correct the slice level. Accordingly, even when the respective levels of the color difference signals are small, the amount of correction of the slice level is increased in colored parts as compared to the prior art. Therefore, the correction can be sufficiently made and the white character correction can be made with higher accuracy.

As described above, the color difference signal correction apparatus according to the first embodiment comprises the full-wave rectification circuit 12 for full-wave rectifying the input color difference signal (R–Y)a, the full-wave rectification circuit 13 for full-wave rectifying the input color difference signal (B–Y)b, the addition circuit 14 for adding the output of the full-wave rectification circuit 12 and the output of the full-wave rectification circuit 13, the addition circuit 4 for adding the white character slice level signal e and the output of the addition circuit 14, the luminance signal slice circuit 5 for slicing the luminance signal g with the output of the addition circuit 4, and the addition circuit 6 for adding the output of the luminance signal slice circuit 5 and the input color difference signal (B–Y)b to output the output color difference signal (B–Y)i. Therefore, the white character slice level for colored parts can be corrected so as not to make the white character correction to light colors like flesh tones. Accordingly, the white character correction can be made with high accuracy only to bright whites, whereby the white character correction which can obtain high-quality images can be performed.

In addition, the color correction gain control circuit 3 for adjusting the gain for the output of the addition circuit 14 in accordance with the digital gain control signal c is provided between the addition circuit 14 and the addition circuit 4. Therefore, the amount of correction of the white character slice level for the colored part can be adjusted, whereby the white character correction can be finely adjusted with high accuracy so that the white character correction is not made to light colors such as flesh tones.

In addition, in this first embodiment, the respective circuits are constituted as the digital circuits. Therefore, the reduction in the accuracy of the white character correction due to the dispersion in resistances, which may occur in the color temperature correction apparatus described as the prior art or the like can be avoided.

In this first embodiment, the respective circuits can be constituted as analog circuits utilizing resistors or the like. In this case, the reduction in accuracy of the white character correction due to the dispersion in the resistances cannot be avoided unlike the case where the respective circuits are constituted as digital circuits. However, the same effects as those in the first embodiment except this point can be obtained.

Embodiment 2

Figure 3:
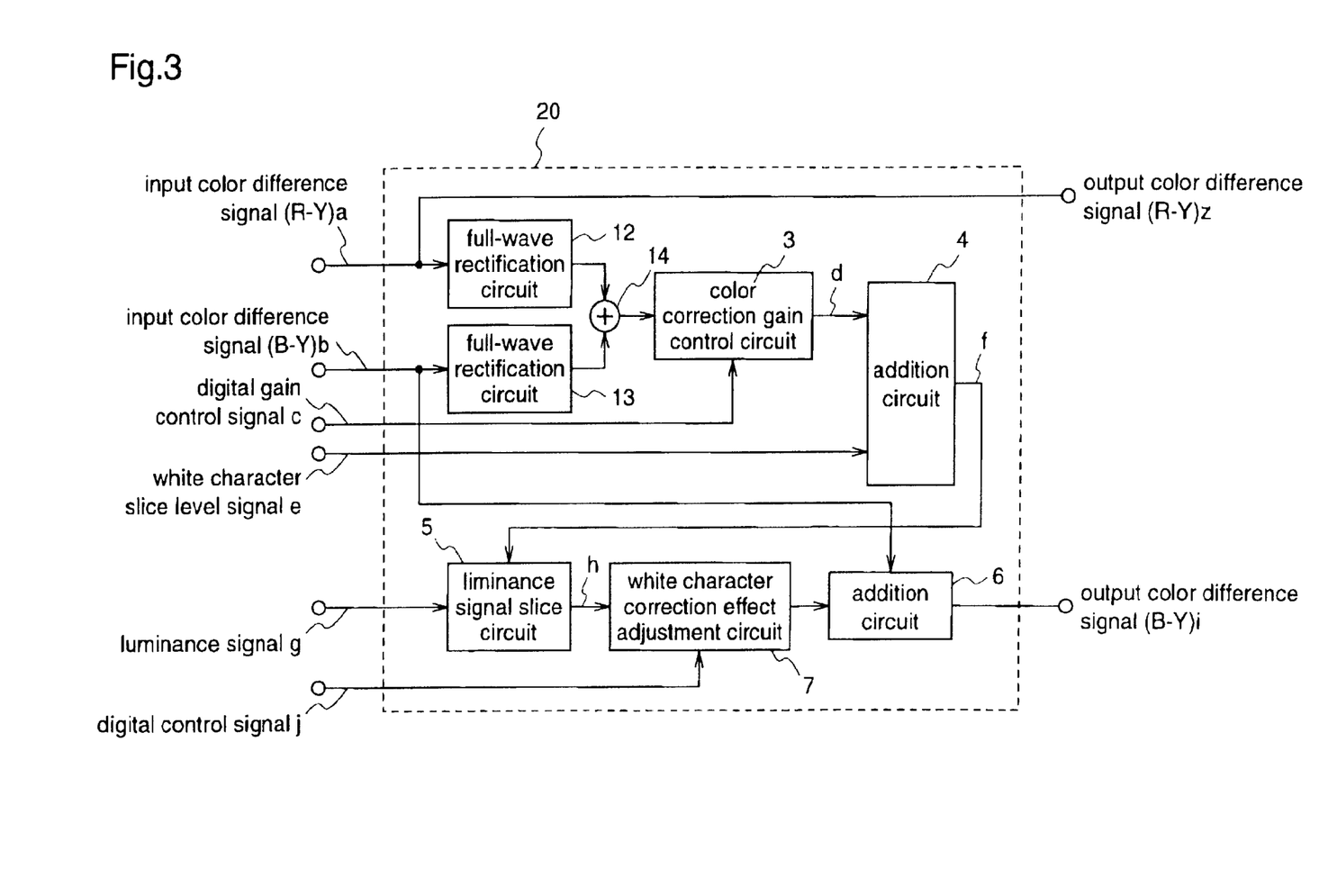
FIG. 3 is a block diagram illustrating a structure of a color difference signal correction apparatus according to a second embodiment of the present invention.

FIG. 3 is a block diagram illustrating a structure of a color difference signal correction apparatus according to the second embodiment of the present invention. In this figure, the same reference numerals as those in FIG. 1 denote the same or corresponding parts. A color difference signal correction apparatus 20 according to the second embodiment is the color difference signal correction apparatus as described in the first embodiment in which a white character correction effect adjustment circuit 7 is provided between the luminance signal slice circuit 5 and the addition circuit 6. The white character correction effect adjustment circuit 7 adjusts the effects of the white character correction to the output signal h from the luminance signal slice circuit 5 so as to obtain an optimum image quality in the state where the video is actually displayed on a display or the like, and outputs an adjusted color difference signal (B–Y) to the addition circuit 6. The white character correction effect adjustment circuit 7 performs gain control for the luminance signal g which has been sliced by the luminance signal slice circuit 5, thereby adjusting the effects of the white character correction. The gain by which the signal is multiplied in the white character correction effect adjustment circuit 7 is decided in accordance with a digital control signal j which is output from the outside. The effects of the white character correction vary with the structures of the apparatus which utilize the color difference signal correction apparatus 20. Therefore, the digital control signal j is previously set in an external microcomputer or the like so as to obtain the optimum image quality in the state where the video is actually displayed on a display or the like. This gain can be changed so as to multiply the signal by 0 to N (N is a positive integer).

As described above, according to this second embodiment, the gain control is performed by the white character correction effect adjustment circuit 7 for the signal which is obtained by the slicing in the luminance signal slice circuit 5, in accordance with the digital control signal j. Therefore, the effects of the white character correction can be finely adjusted with high accuracy.

Embodiment 3

Figure 4:
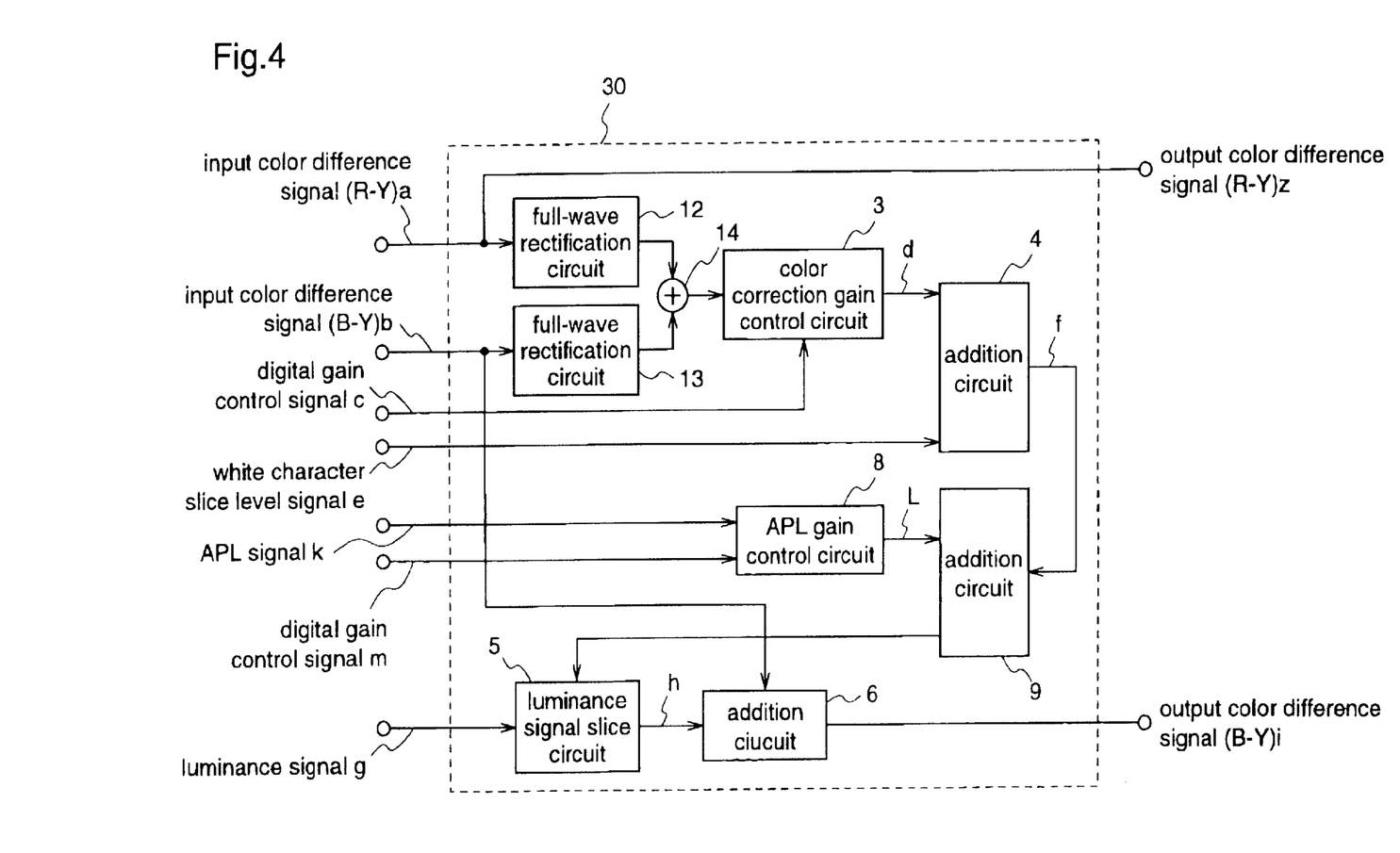
FIG. 4 is a block diagram illustrating a structure of a color difference signal correction apparatus according to a third embodiment of the present invention.

FIG. 4 is a block diagram illustrating a structure of a color difference signal correction apparatus according to the third embodiment of the present invention. In this figure, the same reference numerals as those in FIG. 1 denote the same or corresponding parts.

A color difference signal correction apparatus 30 according to the third embodiment is the color difference signal correction apparatus 10 as shown in the first embodiment in which an APL (average picture level) gain control circuit 8 is provided as well as an addition circuit 9 for adding the output of the APL gain control circuit 8 and the corrected white character slice level signal f as the output of the addition circuit 4 and outputting a signal obtained by the addition as a slice level signal to the luminance signal slice circuit 5 is provided between the addition circuit 4 and the luminance signal slice circuit 5.

Generally, in the field of video signal processing, an APL (average picture level) signal is used for correcting gradation of the video or the like. In this third embodiment, the adjustment of the white character correction is made using this APL signal. Initially, the APL gain control circuit 8 performs gain control for the APL signal k. The gain by which the APL signal k is multiplied is decided in accordance with a digital control signal m which is output from the outside. The effects of the white character correction vary with the structures of apparatus which utilize the color difference signal correction apparatus 20. Therefore, the digital control signal m is previously set in an external microcomputer or the like so as to obtain the optimum image quality in the state where the video is actually displayed on a display or the like. The gain for the APL signal k can be finely adjusted with high accuracy so as to multiply the APL signal k by 0 to 1/N (N is a positive integer).

Subsequently, the corrected APL signal L which is obtained by the APL gain control circuit 8 and the corrected white character slice level signal f which is obtained by the addition circuit 4 are added, and then the luminance signal g is sliced with a slice level signal which is obtained by the addition. Then, the result of this slicing and the input color difference signal (B–Y)b are added by the addition circuit 6, thereby obtaining the output color difference signal (B–Y)i. Thus, when the corrected APL signal L is added to the corrected white character slice level signal f, the slice level is shifted toward the direction in which the whole frame becomes brighter, i.e., the direction in which the level is heightened by the corrected APL signal L, for a frame having a higher APL, i.e., a picture whose frame is entirely whitish. Accordingly, the color temperature correction is hard to be applied and therefore the white character correction is not made.

As described above, according to the third embodiment, the APL gain control circuit 8 controls the gain for the APL signal which is input from the outside. Then, the output of the APL gain control circuit 8 and the corrected white character slice level signal f which is obtained by the addition circuit 4 are added, and then the luminance signal g is sliced by the luminance signal slice circuit 5 with a signal obtained by the addition. Therefore, the fine adjustment can be performed so as to reduce the effects of the white character correction for a frame having a higher APL, i.e., a picture whose frame is entirely whitish, thereby preventing the whole frame becoming bluish. Consequently, even when the brightness level of the whole frame is higher, the white character correction can be applied with high accuracy.

In this third embodiment, the APL gain control circuit 8 is provided. However, in the present invention, when it is unnecessary to adjust the gain for the APL signal, the APL gain control circuit 8 may not be required.

Further, in this third embodiment, the corrected white character slice level signal f which is obtained by correcting the white character slice level signal on the basis of the input color difference signal is added by the addition circuit 9 to the output of the APL gain control circuit 8. However, in this invention, in place of the provision of the full-wave rectification circuit 2, the color correction gain control circuit 3 and the addition circuit 4, it is possible that the white character slice level signal is directly input to the addition circuit 9 to add the white character slice level and the output of the APL gain control circuit 8. Or, it is possible to make correction which is different from the correction using the full-wave rectification circuit 2, the color correction gain control circuit 3 and the addition circuit 4 to the white character slice level signal, then directly input the white character slice level signal to which the correction has been made to the addition circuit 9, and add the white character slice level and the output of the APL gain control circuit 8. Also in these cases, the white character correction can be applied with high accuracy as similar in the third embodiment.

What is claimed is:

1. A color difference signal correction apparatus comprising:
   a first full-wave rectification means for receiving a (R−Y) color difference signal and full-wave rectifying the (R−Y) color difference signal;
   a second full-wave rectification means for receiving a (B−Y) color difference signal and full-wave rectifying the (B−Y) color difference signal;
   a first addition means for adding an output of the first full-wave rectification means and an output of the second full-wave rectification means;
   a second addition means for receiving a white character slice level signal, and adding the white character slice level signal and an output of the first addition means;
   a slice means for receiving a luminance signal and slicing the luminance signal with an output of the second addition means; and
   a third addition means for adding an output of the slice means and the (B−Y) color difference signal.

2. The color difference signal correction apparatus of claim 1 comprising:
   a gain control means for changing a gain of the output of the first addition means and outputting a changed gain to the second addition means, between the first addition means and the second addition means, wherein
   the second addition means adds the white character slice level signal and an output of the gain control means.

3. The color difference signal correction apparatus of claim 1 comprising:
   a white character correction effect adjustment means for changing a gain of the output of the slice means and outputting a changed gain to the third addition means, between the slice means and the third addition means, wherein
   the third addition means adds the (B−Y) color difference signal and the output of the white character correction effect adjustment means.

4. The color difference signal correction apparatus of claim 1 comprising:
   a fourth addition means for receiving an average picture level signal and adding the average picture level signal and the output of the second addition means to output an addition result to the slice means, between the second addition means and the slice means, wherein
   the slice means slices the luminance signal with an output of the fourth addition means.

5. The color difference signal correction apparatus of claim 4 comprising:
   an average picture level gain control means for receiving the average picture level signal and changing a gain of the average picture level signal to output a changed gain to the fourth addition means, wherein
   the fourth addition means adds an output of the average picture level gain control means and the output of the second addition means to output an addition result to the slice means.

6. The color difference signal correction apparatus of claim 2 comprising:
   a white character correction effect adjustment means for changing a gain of the output of the slice means and outputting a changed gain to the third addition means, between the slice means and the third addition means, wherein
   the third addition means adds the (B−Y) color difference signal and the output of the white character correction effect adjustment means.

7. The color difference signal correction apparatus of claim 2 comprising:
   a fourth addition means for receiving an average picture level signal and adding the average picture level signal and the output of the second addition means to output an addition result to the slice means, between the second addition means and the slice means, wherein
   the slice means slices the luminance signal with an output of the fourth addition means.

8. The color difference signal correction apparatus of claim 3 comprising:
   a fourth addition means for receiving an average picture level signal and adding the average picture level signal and the output of the second addition means to output an addition result to the slice means, between the second addition means and the slice means, wherein
   the slice means slices the luminance signal with an output of the fourth addition means.

9. The color difference signal correction apparatus of claim 7 comprising:
   an average picture level gain control means for receiving the average picture level signal and changing a gain of the average picture level signal to output a changed gain to the fourth addition means, wherein
   the fourth addition means adds an output of the average picture level gain control means and the output of the second addition means to output an addition result to the slice means.

10. The color difference signal correction apparatus of claim 8 comprising:
    an average picture level gain control means for receiving the average picture level signal and changing a gain of the average picture level signal to output a changed gain to the fourth addition means, wherein
    the fourth addition means adds an output of the average picture level gain control means and the output of the second addition means to output an addition result to the slice means.

11. A color difference signal correction apparatus comprising:
    a first addition means for receiving a white character slice level signal and an average picture level signal, and adding the white character slice level signal and the average picture level signal;
    a slice means for receiving a luminance signal and slicing the luminance signal with an output of the first addition means; and
    a second addition means for receiving a (B−Y) color difference signal, and adding an output of the slice means and the (B−Y) color difference signal.

12. The color difference correction apparatus of claim 11 comprising:
    an average picture level gain control means for receiving the average picture level signal, and changing a gain of the average picture level signal to output a changed gain to the first addition means, wherein
    the first addition means adds an output of the average picture level gain control means and the white character slice level signal to output an addition result to the slice means.

* * * * *